United States Patent [19]

Johnson et al.

[11] Patent Number: 4,744,962
[45] Date of Patent: May 17, 1988

[54] PROCESS FOR THE REDUCTION OF AMMONIA IN REGENERATION ZONE OFF GAS BY SELECT ADDITION OF NOx TO THE REGENERATION ZONE OR TO THE REGENERATION ZONE OFF GAS

[75] Inventors: Gregory L. Johnson; Norman C. Samish; Diana M. Altrichter, all of Houston, Tex.

[73] Assignee: Shell Oil Company, Houston, Tex.

[21] Appl. No.: 76,530

[22] Filed: Jul. 22, 1987

[51] Int. Cl.⁴ .................................... C01B 21/20
[52] U.S. Cl. .................................... 423/235; 423/237; 208/113; 208/155; 502/41; 502/43; 502/49; 502/50; 502/52; 502/54; 55/68; 55/70
[58] Field of Search .................... 208/120, 113, 155; 502/39, 41, 52, 43, 49, 50, 54; 423/235, 237, 239; 55/70, 68

[56] References Cited

U.S. PATENT DOCUMENTS

| | | | |
|---|---|---|---|
| 3,058,906 | 10/1962 | Stine et al. | 208/111 |
| 4,002,723 | 1/1977 | Inaba et al. | 423/239 |
| 4,081,508 | 3/1978 | Luckenbach | 502/39 |
| 4,104,361 | 8/1978 | Nishikawa et al. | 423/230 |
| 4,115,250 | 9/1978 | Flanders et al. | 208/120 |
| 4,115,251 | 9/1978 | Flanders et al. | 208/120 |
| 4,153,535 | 5/1979 | Vasalos et al. | 208/120 |
| 4,164,546 | 8/1979 | Welty, Jr. et al. | 423/239 |
| 4,181,705 | 1/1980 | Gumerman | 423/235 |
| 4,204,944 | 5/1980 | Flanders et al. | 208/120 |
| 4,204,945 | 5/1980 | Flanders et al. | 208/120 |
| 4,221,677 | 9/1980 | Vasalos et al. | 252/455 |
| 4,238,371 | 12/1980 | Finch | 252/465 |
| 4,251,388 | 2/1981 | Takahashi et al. | 252/429 B |
| 4,259,175 | 3/1981 | McArthur | 502/41 |
| 4,290,878 | 9/1981 | Blanton, Jr. | 208/120 |
| 4,335,084 | 6/1982 | Brogan | 423/235 |
| 4,351,811 | 9/1982 | Matsuda et al. | 423/239 |
| 4,368,057 | 1/1983 | Matthews | 48/197 |
| 4,423,017 | 12/1983 | Dean | 423/235 |
| 4,434,147 | 2/1984 | Dimpfl et al. | 423/235 |
| 4,435,281 | 3/1984 | Vasalos | 502/52 |
| 4,435,282 | 3/1984 | Bertolacini et al. | 208/113 |
| 4,469,662 | 9/1984 | Hamada et al. | 423/237 |
| 4,521,389 | 6/1985 | Blanton et al. | 208/113 |
| 4,551,231 | 11/1985 | Kovach et al. | 208/120 |
| 4,624,840 | 11/1986 | Dean et al. | 423/235 |

FOREIGN PATENT DOCUMENTS 3523355 7/1986 Fed. Rep. of Germany ...... 252/351

OTHER PUBLICATIONS

Abstract 78465B/43 J7, 9030-318.

Primary Examiner—Helen M. S. Sneed
Assistant Examiner—Anthony McFarlane
Attorney, Agent, or Firm—Kimbley L. Muller

[57] ABSTRACT

A regeneration zone for fluid catalytic cracking contains ammonia ($NH_3$) when the regeneration zone is operated in a partial combustion mode as defined by a content of CO of between 1 and 6 percent by volume. If the ammonia is not removed from the regeneration zone off gass, the same will be passed to a CO combustion zone where, in the presence of oxygen, CO is oxidized to $CO_2$ and some of the ammonia will undesirably be oxidized to $NO_x$. This invention reduces the presence of ammonia in the feed gas to a CO combustion zone of an FCC process by the introduction of a $NO_x$-containing gas to dilute phase of a regeneration zone or to a regeneration zone off gas. Ammonia, $NO_x$ and oxygen present in the regeneration zone off gas of the regeneration zone, will tend to react to produce nitrogen and water vapor, which then is passed to the CO combustion zone for CO oxidation to $CO_2$. Where the addition of $NO_x$ is made at temperatures greater than 1700° F., hydroxyl precursor addition may not be required. Where addition is made at temperatures lower than 1700° F. a hydroxyl precursor may be added to the gas admixtures.

21 Claims, 1 Drawing Sheet

PROCESS FOR THE REDUCTION OF AMMONIA IN REGENERATION ZONE OFF GAS BY SELECT ADDITION OF NO$_x$ TO THE REGENERATION ZONE OR TO THE REGENERATION ZONE OFF GAS

FIELD OF THE INVENTION

This application relates to a fluid catalytic cracking (FCC) process where nitrogen oxide (NO$_x$) levels in the flue gas are reduced after passage of the flue gas through a CO boiler (combustion zone) and optionally an electrostatic precipitator before passage to the environment through a stack or chimney.

With the advent of modern FCC cracking catalysts, such as crystalline aluminosilicate zeolites, attempts have been made to reduce the coke content of regenerated FCC catalyst to a very low level, i.e., below 0.2 weight percent. In order to insure complete combustion of the coke on the catalyst to carbon monoxide, and then to carbon dioxide during regeneration, a CO combustion promoter has been added to FCC regeneration systems. These promotors, such as platinum, have been employed on the FCC catalyst, per se, or in a small amount on particulate solids mixed with the cracking system. Use of these promotors usually results in a CO content of less than 1 percent by volume in the regenerator off gas, also referred to as regenerator effluent or flue gas.

This invention is concerned with the control of ammonia content in an FCC regenerator off gas. This invention is a means to provide for compliance with strict air pollution standards, especially in California, without resort to an increase in capital expenditure or to the addition of components harmful to the catalyst or the hydrocarbonaceous product derived from an FCC process.

BACKGROUND OF THE INVENTION

Older, more established FCC catalyst regeneration techniques are operated in an incomplete mode of combustion. This invention is concerned with such modes of operation. These systems are usually referred to as "standard regeneration" wherein a relatively large amount of coke is left on the regenerated catalyst which is passed from an FCC regeneration zone to an FCC reaction zone. The content of CO in the regeneration zone is relatively high, i.e., 1 to 6 volume percent. The concentration of carbon is approximately 0.25 to 0.45 weight percent carbon on the regenerated catalyst. In U.S. Pat. No. 4,435,282, issued to Bertolacini et al, a system for substantially complete combustion of coke on an FCC molecular sieve catalyst is disclosed. In the regenerator, hydrocarbon conversion catalyst particles are associated with particles of a platinum group metal, an oxidation catalyst, which promotes the combustion of carbon monoxide to carbon dioxide. The gaseous effluent from such a regeneration operated in a "full combustion mode" has a low CO content and a high CO$_2$ content. The catalyst particles in an FCC process are finely divided particulate solids having a size of between 20 microns and 150 microns to insure adequate fluidization. U.S. Pat. Nos. 4,153,535, 4,221,677, and 4,238,371 issued to Vasalos et al concern the operation of a cyclic, fluidized, catalytic cracking process with a reduction in the emission of CO and SO$_x$. A metallic promoter is incorporated into a molecular sieve-type cracking catalytic such that a stable sulfur-containing compound forms on the solid particles in the regeneration zone and a sulfur-containing gas is then withdrawn in a downstream sulfur stripping zone.

Nitrogen sensitivity of a hydrocracking catalyst has been found to be negated by introducing into the hydrocracking zone a halogen-containing compound and water with the hydrocarbonaceous feed. See Stine et al, U.S. Pat. No. 3,058,906. A number of U.S. patents issued to Chevron in the late 1970's and early 1980's concern catalytic conversion of nitrogen oxides to thereby control the nitrogen oxide levels in a flue gas generated by a catalyst regenerator.

In U.S. Pat. No. 4,204,945, a process is disclosed for removal of carbon monoxide and sulfur oxides from a flue gas of a catalyst regenerator of an FCC system. Sufficient molecular oxygen is introduced into the catalyst regenerator to provide an atmosphere having a molecular oxygen concentration of at least 0.1 volume percent. A particular carbon monoxide combustion promoter is physically admixed with the cracking catalyst to provide for total consumption of the coke to CO$_2$. Sulfur oxides in the regenerator off gas are contacted with a silica-free alumina to form a sulfur-containing solid on the catalyst and thereafter hydrogen sulfide in the cracking reactor. In U.S. Pat. No. 4,204,944 issued to the same patentees, Flanders et al, a process is provided for an FCC unit having a non-zeolitic crystalline refractory inorganic oxide catalyst. The amount of carbon monoxide and sulfur oxides in the regenerator flue gas is reduced by reacting carbon monoxide and oxygen to carbon dioxide in the presence of a carbon monoxide oxidation promoter, inclusive of platinum. Sulfur and an alumina-containing solid are present wherein sulfur trioxide is reacted with alumina and thereafter hydrogen sulfide is formed in the cracking zone by contact of the sulfur and alumina-containing solid with the hydrocarbon feed stream. Similar techniques are provided in U.S. Pat. Nos. 4,115,250 and 4,115,251, Flanders et al, for the reduction of pollution emissions using an alumina-containing catalyst in association with a CO promoter.

NO$_x$ is controlled in the presence of a platinum-promoted complete combustion regenerator in U.S. Pat. No. 4,290,878, issued to Blanton. Recognition is made of the fact that the CO promoters result in a flue gas having an increased content of nitrogen oxides. These nitrogen oxides are reduced or suppressed by using, in addition to the CO promoter, a small amount of an iridium or rhodium compound sufficient to convert NO$_x$ to nitrogen and water.

Both catalytic and non-catalytic addition of ammonia to a flue gas system has been utilized to reduce NO$_x$. Usually the non-catalytic method includes the injection of ammonia to a NO$_x$-containing stream at temperatures greater than 1300° F. Exemplary of this type of process is Dean et al, U.S. Pat. No. 4,624,840, wherein ammonia is injected into a combustion effluent stream at a temperature of 1300°K. to 1600°K. at a point where the stream is cooling at a rate of at least 250°K. per second. See also U.S. Pat. No. 4,507,269 issued to the same patentees. Trapped cracking catalyst fines and ammonia are injected to a sulphur oxide and nitrogen oxide effluent stream to remove nitrogen oxides in Dimpfl et al, U.S. Pat. No. 4,434,147. Where an excess stoichiometric amount of ammonia is added to the flue gas system, a situation evolves, known as "ammonia breakthrough", whereby unreacted ammonia is emitted to the atmosphere as a pollutant. In order to reduce the ammonia breakthrough problem, U.S. Pat. No. 4,423,017, Dean, discloses the use of an additional reducing gas and placement of metallic material at the end of the reduction zone maintained at a temperature of 700° C. to 1100° C. In non-catalytic ammonia addition systems, excess ammonia over that required to vitiate the quantity of $NO_x$ can be oxidized to $NO_x$ by the subsequent addition of secondary air. However, Brogan, U.S. Pat. No. 4,335,084, discloses that this subsequent addition of air will not convert excess ammonia to $NO_x$ if the temperature in the air injection zone is below 2400° F. Caution is, however, expressed that the temperature must not fall below 1900° F. because of freeze-out problems with CO at temperatures below 1900° F.

Exemplary of catalytic systems where ammonia is added to convert $NO_x$ to nitrogen and water vapor are U.S. Pat. Nos. 4,164,546, 4,104,361, and 4,002,723. The first of these patents, issued to Welty Jr. et al, describes the use of a copper oxide on alumina catalyst and generically described as a Group IB, Group VIB, Group VIIB, or Group VIII metal. The latter of these references, issued to Inaba et al, discloses the use of a copper on alumina catalyst with the presence of an alkali metal or an alkali earth metal with the optional presence of a small amount of a precious metal such rhodium, ruthenium, platinum or pallidium. The alkali metal content of these catalysts is important in the conversion of ammonia and $NO_x$ to nitrogen and water vapor as exemplified in U.S. Pat. No. 4,104,361 issued to Nishikawa et al wherein the alkali metal content of a zeolite is controlled through ion exchange with an alkaline earth metal compound before deposit of a noble metal catalyst and a base metal of copper, iron, vanadium, chromium or molybdenum onto the alumina. Nitrogen oxide in a fluidized bed can also be reduced by the direct introduction of ammonia into the fluidized bed as disclosed in Gumerman, U.S. Pat. No. 4,181,705.

Another process technique to reduce the amount of $NO_x$ in a flue gas was described in U.S. Pat. No. 4,521,388, Samish et al, wherein a flue gas stream is split and only one of the streams is treated with ammonia and $NO_x$ to remove $NO_x$ therefrom, and thereafter combining the streams. By treating only a portion of the flue gas, the amount of catalyst required to perform the $NO_x$ reduction is reduced while residual $NO_x$ and ammonia contents of the recombined streams is controlled to a desired level. Recognition is made in U.S. Pat. No. 4,351,811, Matusda et al, of a reduction process of $NO_x$ with ammonia. In order to obtain a proper stoichimetric quantity of $NO_x$ to ammonia, the concentration of $NO_x$ is adjusted by addition of predetermined amounts of NO or $NO_2$ to the gas to be treated. The patentees describe a process where the quantity of ammonia added is 0.8 to 2.0 mole times as large as the total quantity of NO and $NO_2$ in the gas to be treated. By making the quantity of additive ammonia as small as possible with respect to the quantity of $NO_x$, then unreacted ammonia contained in the process exhaust gas can be suppressed to a small quantity.

In Matthews, U.S. Pat. No. 4,368,057, a process is disclosed for converting $NH_3$ to $N_2$ by adding a sufficient amount of $NO_x$. The $NH_3$-containing stream is a pre-combustion stream derived from coal gasification and not in an FCC reactor-regenerator process scheme. Japanese patent No. J7 9030-318, Hitachi, disclosed mixing an ammonia-containing gas with $NO_x$ and then contacting with a catalyst to remove the ammonia by reaction with $NO_x$. The prior art has failed to recognize the problems of ammonia content in a partial combustion mode regeneration zone and has failed to recognize that this residual quantity of ammonia, when passed through a CO boiler to convert CO to $CO_2$, will result in an increase in $NO_x$ production.

OBJECTS AND EMBODIMENTS

It is an object of this invention to provide a process for the reduction of $NO_x$ in a fluid catalytic cracking regenerator off gas by diminishment and control of ammonia being emitted in the regeneration zone effluent.

Another object of this invention is to provide for the control of nitrogen oxides in a fluidized catalytic cracking process having ammonia in the regeneration zone off gas by the addition of nitrogen oxides to vitiate or reduce the content of ammonia gas.

Another object of this invention is to provide a control process for a regeneration zone off gas to provide for a CO oxidation zone combustion feed stream with a reduced content of ammonia and therefore a CO combustion zone effluent stream having a reduced content of $NO_x$.

Another object of this invention is to provide for a continuous process for the reduction of ammonia content in the regeneration zone off gas by the addition of a select amount of $NO_x$, or $NO_x$-producing substances such as $HNO_3$, to react with the ammonia to form nitrogen and water vapor.

One embodiment of this invention resides in a process for the reduction of $NO_x$ emissions in an FCC regenerator flue gas emitted from an FCC regeneration zone operated in a partial mode of combustion to form CO, $CO_2$, $O_2$, and $NH_3$ in said flue gas which process comprises combining said flue gas with an additive gas stream comprised of $NO_x$ and maintaining said admixture for a period of time sufficient to permit said $NH_3$, $O_2$, and $NO_x$ to combine to form $H_2O$ and $N_2$.

Another embodiment of this invention resides in a process to reduce $NO_x$ emissions in a catalyst regeneration zone effluent gas from a catalyst regeneration zone operated in a partial combustion mode to form said effluent gas comprising spent catalyst, $CO_2$, from about 1 percent to about 6 percent CO, $O_2$, and from 10 ppm to 10,000 ppm $NH_3$ which comprises passing said regeneration effluent gas from said catalyst regeneration zone to a separation means to separate said spent catalyst and to form a gas effluent separation stream comprising at least CO, $CO_2$, $H_2$ and $N_2$; passing said effluent separation stream to a CO combustion zone in the presence of an added oxygen-containing gas to combust CO in said gas effluent separation stream to $CO_2$ and to form a CO combustion zone effluent stream comprising $CO_2$, $N_2$ and $H_2O$; passing said combustion zone effluent stream from the process with a reduced $NO_x$ emission, as a result of the improvement of this invention which consists of combining said regeneration effluent gas with an additive gas stream comprising $NO_x$, or a $NO_x$-producing substance such as $HNO_3$ to react said $NO_x$ with said $NH_3$ and $O_2$ and thereby produce a stream of reduced $NH_3$ content which is passed to said CO combustion zone. The addition of the $NO_x$ or $NO_x$ precursor may also be made to the regeneration zone per se.

BRIEF DESCRIPTION OF THE INVENTION

This invention is concerned with reduction of ammonia ($NH_3$) in an off gas stream derived from a fluid catalytic cracking regeneration zone operated in a partial mode of combustion by adding a predetermined specific amount of $NO_x$ to the off gas stream. Broadly, this invention is concerned with a method to reduce $NO_x$ content in an effluent stream containing carbon dioxide, carbon monoxide and ammonia by adding $NO_x$ to form a combined gas stream having an increased quantity of nitrogen and water vapor. If the combination of the two gas streams is made at a temperature lower than 1700° F., then an additional component that is a precursor of hydroxyl (OH) such as hydrogen, oxygen, hydrogen peroxide, or formaldehyde, may also be added to the gas stream.

DETAILED DESCRIPTION OF THE INVENTION

The present invention is concerned with a reduction in $NO_x$ emissions in a fluidized catalytic cracking system to produce petrochemical feedstocks wherein catalyst is regenerated in the presence of oxygen. Suitable feedstocks to this type of process include petroleum distillates or residuals of crude oil which, when catalytically cracked, provide either a gasoline or gas oil product. Synthetic feeds having boiling points of from 400° F. to about 1000° F. may also be included as exemplified by oils derived from coal or shale oil.

The catalytic cracking of these petroleum distillates, which are relatively high molecular weight hydrocarbons, results in the production of lower molecular weight hydrocarbon products. The cracking is performed in the catalytic cracking reactor which is separate and distinct from the catalyst regeneration zone. The cracking is performed in a manner in cyclical communication with a catalyst regeneration zone, commonly called a regenerator. Catalysts suitable in this type of catalytic cracking system include siliceous inorganic oxides, such as silica, alumina, or silica-containing cracking catalysts, including crystalline aluminosilicate zeolites associated with a porous refractory oxide matrix, such as a clay or the like. Zeolites suitable for these types of systems include an X-type zeolite or a Y-type zeolite having a very low sodium content. It is desirable to separate the hydrocarbon products from the catalyst immediately after cracking. For this reason, a stripping zone is usually placed intermediate to the cracking reactor and the regenerator to cause quick or rapid disengagement of the hydrocarbon products from the catalyst. The stripping zone is maintained at a temperature of about 600° F. to about 1000° F. and usually has an inert gas such as steam or nitrogen to aid the stripping.

The cracking conditions employed during the conversion of the higher molecular weight hydrocarbons to lower molecular weight hydrocarbons include a temperature of from about 600° F. to about 1000° F. A catalyst to hydrocarbon weight ratio of about 3 to 10 and a weight hourly space velocity of from about 5 to about 50 per hour is contemplated for the hydrocarbon conversion. The average amount of coke deposited on the surface of the catalyst is between 0.5 weight percent and 2.5 weight percent depending on the composition of the feed material. Rapid disengagement after cracking is again achieved via the stripping zone.

Catalyst passed from the stripping zone to the catalyst regeneration zone will undergo regeneration in the presence of oxygen in the catalyst regeneration zone. This zone usually includes a lower dense bed of catalyst having a temperature of about 900° F. to about 1200° F. and a surmounted dilute phase of catalyst having a temperature of about from about 700° F. to about 1100° F. In order to remove the coke from the catalyst, oxygen is supplied in a stoichiometric or substoichiometric relationship to the coke on spent catalyst. This oxygen may be added by means of any suitable sparging device in the bottom of the regeneration zone or, if desired, additional oxygen can be added in the dilute phase of the regeneration zone surmounted to the dense phase of catalyst. In this invention it is not necessary to provide an over-stoichimetric quantity of oxygen to operate the regeneration zone in a complete combustion mode as is currently in fashion in many FCC units. In fact, this invention concerns a regeneration zone operated in a standard mode of operation which comprises a partial combustion mode or sometimes referred to as a reducing mode wherein the quantity of carbon monoxide in the regeneration zone is maintained at a level of from 1 to 6 percent by volume. It is preferred that the quantity of coke on the catalyst be reduced to approximately 0.5 weight percent before return of the catalyst to the catalytic cracking zone. It is possible that a CO combustor promotor may be utilized, such as a platinum group metal dispersed on the FCC catalyst, to provide incentive to convert CO to $CO_2$.

When the regeneration zone is operated in a partial mode of combustion, having from 1 to 6 volume percent CO, the off gas stream contains a sizable amount of ammonia ($NH_3$). This amount of ammonia may range from 10 parts per million to 10,000 parts per million, depending on the composition of the feed material. After requisite separation from the regenerated catalyst, the flue gas stream is passed to a CO boiler where the small amount of CO is converted to $CO_2$ in the presence of oxygen and, if desired, a catalytic agent. If the ammonia is allowed to enter the CO boiler, much of it then usually becomes converted to $NO_x$ during the CO oxidation to $CO_2$. In this event, an additional amount of $NO_x$ will be passed to the atmosphere.

In order to eliminate this extra amount of $NO_x$ being formed in the CO boiler, the regenerator or the regenerator off gas that contains $NH_3$ is treated with approximately as much moler amount of nitrogen oxides (herein defined as $NO_x$, or substances that are precursors to $NO_x$ such as $HNO_3$) to react with $NH_3$ and oxygen in the regenerator vessel or off gas stream to produce nitrogen and water vapor. Streams containing 500 to 1,000,000 parts per million $NO_x$ are introduced into the regenerator gas to react with the ammonia. It is conceivable that the $NO_x$ may be acquired by a large number of methods, one of which comprises the combustion of ammonia. It is also conceivable that the heat balance in the reaction can be enhanced by use of combustion gas as a source of heat for the $NH_3/NO_x$ reaction. If the passage of $NO_x$ to the flue gas or regenerator is at a temperature less than 1700° F. then an additional gas, comprising a precursor of hydroxyl, OH, such as hydrogen, oxygen, hydrogen peroxide, formaldehyde, and mixtures of these gases, is added to the stream to help promote the reaction of $NO_x$ and ammonia.

The advantage of this invention is that $NO_x$ can be reduced in a FCC system operated under a partial mode of combustion with existing equipment with only minor revisions or alterations to control input of $NO_x$. It is desired that the $NO_x$ be added in substantially equal stoichimetric relationship with the quantity of ammonia in the combustion zone feed gas. The $NO_x$ content of the stream to be added can range from 500 to 1,000,000 ppm. It is preferred that the feed gas to the combustion zone be admixed with the additive gas for a period of time sufficient to convert the ammonia, oxygen, and $NO_x$ to nitrogen and water vapor before entry to the combustion zone. This period of time may comprise from about 0.1 seconds to about 3 seconds. This time will usually be dependent on the temperature of the flue gas derived from the regeneration zone, i.e., the cooler the gas the longer the time period. If necessary, additional oxygen may be added to the feed gas to the combustion zone to maximize the $NO_x$ vitiation of the ammonia. This oxygen concentration should be from about 0.1 to 6 percent by volume of the flue gas derived from the regeneration zone.

The CO boiler is operated at conditions comprising a temperature of from about 1000° F. to about 3500° F. in order to ensure complete conversion of CO to $CO_2$. Upstream or downstream of the CO boiler, an electrostatic precipitator may be utilized to remove dust which was entrained in the regeneration gas stream.

ILLUSTRATIVE EMBODIMENTS

In a fluidized catalytic cracking unit, a regenerator operates to burn coke off catalyst in the presence of oxygen. In partial combustion mode, the regenerator off gas typically contains 0.4 percent oxygen, 15 percent $CO_2$, 12 percent $H_2O$, 200 ppm $SO_2$, 500 ppm $NH_3$, 100 ppm HCN, 4 percent CO, with the balance being inert nitrogen. In conventional FCC units, the gas is sent through a series of cyclone dust separators, expander turbines, CO boilers, electrostatic precipitators, and then to the environment via stack emissions. In the CO boiler, if the flue gas stream is not treated, much of the 500 ppm ammonia and 100 ppm HCN will be converted to $NO_x$ and discharged through the stack. This invention highlights the method of reducing the $NO_x$ emissions by adding to this flue gas 500 ppm $NO_x$, which can be any nitrogen oxides or precursors of nitrogen oxides, prior to entry of the flue gas to the CO boiler. If necessary, decomposition catalysts may be added to this flue gas stream, comprising any catalysts which will promote the reaction of $NO_x$ and ammonia, such as platinum or alumina. It is preferable that the feed gas to the combustion zone be substantially free of ammonia before CO oxidation occurs.

DETAILED DESCRIPTION OF THE DRAWINGS

Figure 1:
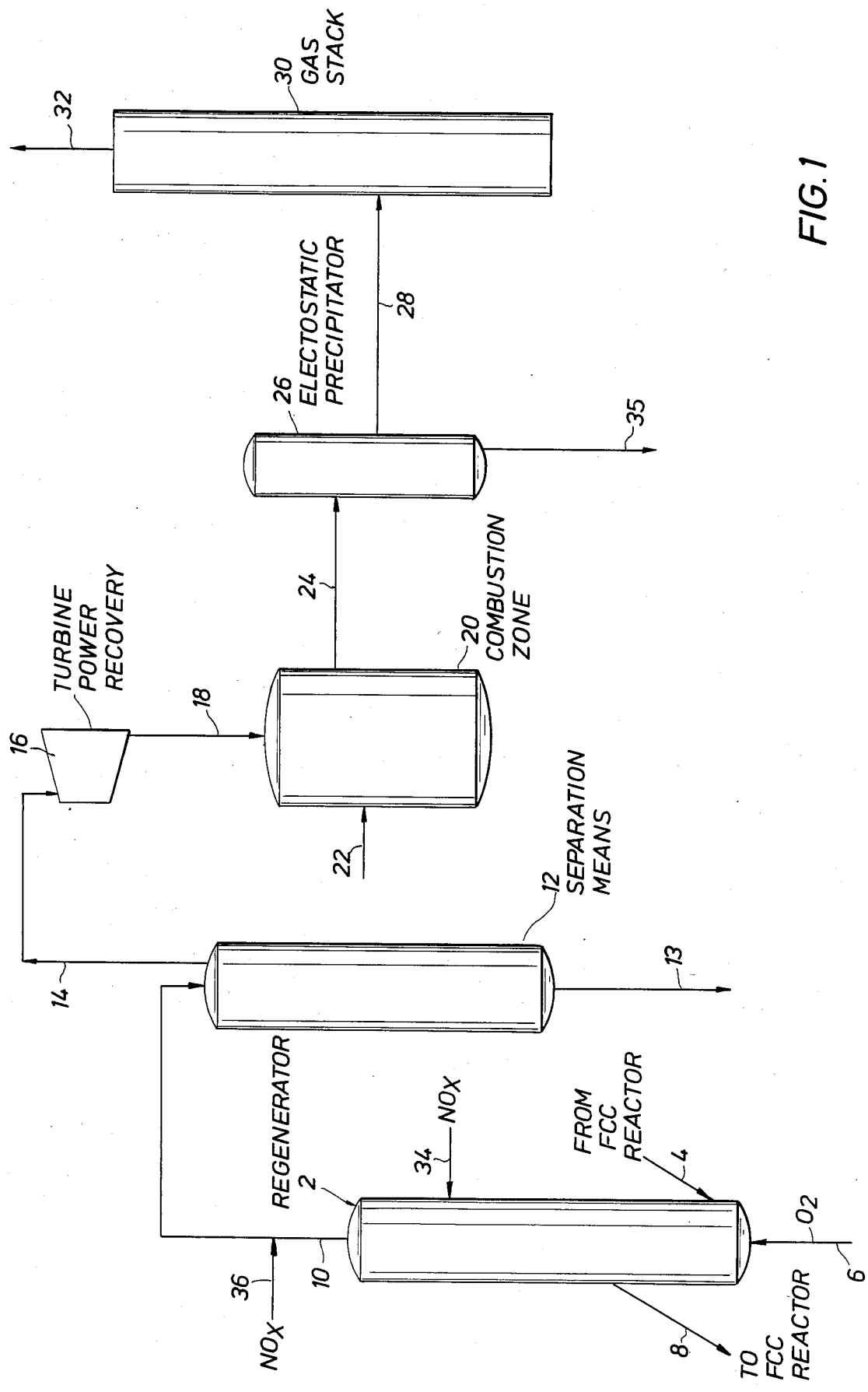
FIG. 1 is a representative of a flow scheme of the process of this invention.

Spent catalyst is added to regenerator 2 through conduit 4 which connects to an FCC reactor and a stripping means, both of which are not shown in the instant drawing. Oxygen is supplied by means of conduit 6 to the regenerator to provide operation of the regeneration zone in a mode of substantially incomplete combustion defined as having a CO content of 1 to 6 percent by volume. Regenerated catalyst is withdrawn in conduit 8 and passed by conduit 8 to the FCC reactor. A stream comprising a flue gas is removed from regenerator 2 in conduit 10 containing particle fines which are separated in separation means 12. This separation means accepts catalyst fines and flue gas, removes the fines from the flue gas and returns the fines via conduit 13 to the regenerator or FCC reactor. The oxygen content of this stream should be from 0.1 to 6.0 percent. If needed, additional oxygen can be added prior to $NO_x$ admixture via conduit 34 or 36.

The separation means contemplated within the scope of this invention normally comprises a set of vertical cyclone separators communicating to eliminate any catalyst fines from the flue gas. The gas emitted from separation means 12 in conduit 14 is substantially free of solid catalytic particles. Power derivable from gas stream 14 is recovered in power recovery unit 16 after which the gas is passed to CO boiler 20 by means of conduit 18. Oxygen, usually in the form of air, is added to CO boiler 20 through conduit 22. If ammonia is present in conduit 18, some of it will convert to $NO_x$ and increase the $NO_x$ content in conduit 24 egressing from CO boiler 20. In the CO boiler, a sufficient amount of oxygen is added in conduit 22 to substantially completely combust CO to $CO_2$. In order to eliminate dust contaminants, an electrostatic precipitator 26 is utilized to clean up the final passage of the gas before passage in conduit 28 to stack 30 and ultimate passage to the environment through conduit 32. Any unwanted pollutants are removed from electrostatic precipitator 26 by means of a slip stream in conduit 35.

In accordance with this invention, a predetermined near stoichimetric amount of $NO_x$ is added by means of conduit 36 to flue gas stream 10 leaving the regenerator. The gases are allowed to contact with one another for a period of time sufficient to permit $NH_3$, $O_2$ and $NH_3$ conversion to $N_2$, $H_2$, and $H_2O$ before entry to CO boiler 20. This period of time usually consumes from 0.1 seconds to 3 seconds. The addition of the $NO_x$ is preferably made at a temperature above 1700° F. which can be attained by heating stream 10 with a duct burner prior to admixture of $NO_x$ via conduit 36. Alternatively, $NO_x$ may be added by conduit 34 to the regenerator, most preferably in the dilute phase. The amount of $NO_x$ added to the regenerator is preferably stoichiometric but an over-stoichiometric or under-stoichiometric amount of $NO_x$ can be added to minimize $NO_x$ emission from the CO boiler. It is contemplated that both $NO_x$ streams 34 and 36 are supplied from a unitary manifold communicating with a unit in which ammonia is being combusted in the presence of oxygen (or by other means) to generate to $NO_x$. In this manner, the $NO_x$ content in conduits 28 and 24 is substantially reduced by the addition of $NO_x$ to the ammonia-containing stream 10 via conduit 36 or to the ammonia-containing regenerator 2 via conduit 34.

What is claimed is:

1. A process to reduce $NO_x$ content in a CO combustion zone effluent stream of a fluid catalytic cracking process having a regeneration zone operated in a partial mode of combustion wherein said regeneration zone contains from 1 to 6 volume percent CO which comprises combining a regeneration zone off gas stream containing CO, $CO_2$, HCN and $NH_3$ with an additive gas stream comprising a substantially stoichiometric quantity of $NO_x$ compared to the quantity of $NH_3$ in said off gas stream, to form a combined gas stream, passing said combined gas stream to said CO combustion zone in which an oxygen-containing gas is added for the combustion of CO to $CO_2$ and to form said combustion zone effluent stream, wherein the content of $NO_x$ in said combustion zone effluent stream is reduced as a result of the reaction of said $NH_3$ with said added $NO_x$ prior to entry of said combined gas stream to said combustion zone.

2. The process of claim 1 wherein the quantity of $NO_x$ in said additive gas stream is a greater than a stoichimetric equivalent of the quantity of $NH_3$ in said combustion zone feed gas.

3. The process of claim 1 wherein the quantity of $NO_x$ in said additive gas stream ranges from about 500 to about 1,000,000 ppm.

4. The process of claim 1 wherein said additive gas stream contains a gas selected from the group consisting of $H_2$, $O_2$, $H_2O_2$, formaldehyde, mixtures thereof, and precursors of said gases.

5. The process of claim 1 wherein said additive gas stream comprises $NO_x$ and a gas selected from the group consisting of $H_2$, $O_2$, $H_2O_2$, formaldehyde and a precursor of said gas, and where said combination with said regeneration zone off gas stream is performed at a temperature lower than about 1700° F.

6. The process of claim 1 wherein said regeneration zone off gas stream passed to said combustion zone contains $O_2$ in a concentration to provide a volume percent $O_2$ content of from 0.1 to 2.0 percent.

7. The process of claim 1 wherein said regeneration zone off gas stream contains a concentration of $NH_3$ of from about 50 ppm to about 10,000 ppm before entry of said additive gas stream.

8. The process of claim 1 wherein said regeneration off gas stream and said additive gas stream are combined for a period of time sufficient to convert said $NH_3$, $O_2$, and $NO_x$ to $N_2$, $H_2$ and $H_2O$ before entry of said combined stream to said CO combustion zone.

9. The process of claim 8 wherein said period of time is from about 0.1 second to about 3 seconds.

10. A process for the reduction of $NO_x$ emissions from a fluid catalytic cracking regeneration zone operated in a partial mode of combustion wherein said regeneration zone contains from 1 to 6 volume percent CO to form CO, $CO_2$, $O_2$, HCN, and $NH_3$ in said flue gas, which process comprises combining said flue gas with an additive gas stream comprised of $NO_x$ and maintaining said admixture for a period of time sufficient to permit said $NH_3$, $O_2$, and $NO_x$ to combine to form $H_2O$ and $N_2$.

11. The process of claim 10 wherein said combination of said flue gas and said additive gas stream is performed at a temperature above 1700° F. in a transfer duct intermediate said regeneration zone and a CO combustion zone.

12. The process of claim 11 wherein said temperature above 1700° F. is achieved by means of a duct burner positioned to heat said flue gas before said combination of said flue gas with said additive gas stream.

13. The process of claim 10 wherein said combined streams of regeneration zone flue gas and additive gas stream are passed to a CO combustion zone, where, in the presence of $O_2$, CO is combusted to $CO_2$ to form a combustion zone effluent and where said combustion zone effluent has a reduced content of $NO_x$ as a result of the removal of $NH_3$ from the regeneration flue gas stream by reaction of said $NH_3$ with said $NO_x$.

14. The process of claim 10 wherein said regeneration flue gas stream is combined with said additive gas stream at a temperature of from about 800° F. to about 2000° F. without cooling of said regeneration flue gas stream prior to said combination.

15. The process of claim 10 wherein said additive gas stream comprises a gas selected from the group consisting of $H_2$, $O_2$, $H_2O$, formaldehyde, mixtures thereof and precursors of said gases.

16. The process of claim 10 wherein said admixture of said additive gas stream and said regeneration flue gas stream contains an $O_2$ content of from 0.1 to 6.0 percent by volume.

17. In a process to reduce $NO_x$ emissions in a fluid catalyst regeneration zone effluent gas derived from a catalyst regeneration zone of a fluid catalytic cracking process, wherein said zone is operated in a partial combustion mode wherein said regeneration zone contains from about 1 to 6 volume percent CO to form said effluent gas comprising spent catalyst, $CO_2$, $N_2$, $H_2O$, from about 1 percent to about 6 percent CO, $O_2$, HCN, and from 10 ppm to 10,000 ppm $NH_3$ which comprises:

(a) passing said regeneration zone effluent gas from said catalyst regeneration zone to a separation means to separate said spent catalyst from said $CO_2$, CO, HCN, $O_2$, $N_2$, $H_2O$, and $NH_3$ to provide a separation gas stream comprising at least CO, HCN, $CO_2$, $O_2$, $H_2O$, $NH_3$, and $N_2$;

(b) passing said separation gas stream to a CO combustion zone in the presence of an oxygen-containing gas to combust CO in said separation gas stream to $CO_2$ and to form a CO combustion zone effluent stream comprising $CO_2$, $N_2$ and $H_2O$;

(c) passing said combustion zone effluent stream from the process to the environment with a reduced $NO_x$ emission as a result of the improvement which consists of:

(i) combining said regeneration effluent gas with an additive gas stream comprising $NO_x$ or a precursor of $NO_x$ to react with said $NH_3$ and $O_2$ and thereby produce a stream of reduced $NH_3$ content which is passed to said CO combustion zone; or (ii) passing an additive gas stream comprising $NO_x$ or a precursor of $NO_x$ to said regeneration zone to react with $NH_3$ and $O_2$ in said regeneration zone to form a stream of reduced $NH_3$ content which is passed to said CO combustion zone.

18. The process of claim 17 wherein said amount of $NO_x$ added in said additive gas stream of step (i) or (ii) is equal to a stoichiometric equivalent of said content of $NH_3$ in said regeneration zone or said regeneration zone effluent stream and comprises from 500 to about 1,000,000 ppm $NO_x$.

19. The process of claim 17 wherein said regeneration effluent gas has a temperature of from 800° F. to about 2000° F. and wherein said separation gas stream is passed to a power recovery turbine intermediate to said separation means and said CO combustion zone.

20. The process of claim 17 wherein said CO combustion effluent stream is passed to an electrostatic precipitation zone intermediate to said CO combustion zone and said passage to the environment.

21. The process of claim 17 wherein said precursor of $NO_x$ comprises $HNO_3$.

* * * * *